(12) United States Patent
Aron

(10) Patent No.: US 7,425,893 B2
(45) Date of Patent: Sep. 16, 2008

(54) INTEGRATED MOTORCYCLE LIGHT FRAME AND TURN SIGNAL ASSEMBLY

(76) Inventor: Mathew Randolph Aron, 2181 Willow St., San Diego, CA (US) 92106

( * ) Notice: Subject to any disclaimer, the term of this patent is extended or adjusted under 35 U.S.C. 154(b) by 631 days.

(21) Appl. No.: 11/174,038

(22) Filed: Jun. 29, 2005

(65) Prior Publication Data

US 2007/0002573 A1    Jan. 4, 2007

(51) Int. Cl.
*B60Q 1/34* (2006.01)
*B62J 6/00* (2006.01)

(52) U.S. Cl. .............. 340/465; 340/472; 340/473; 340/478; 362/473; 362/475

(58) Field of Classification Search .......... 340/465, 340/472; 362/475, 473, 498; D26/139
See application file for complete search history.

(56) References Cited

U.S. PATENT DOCUMENTS

| | | | |
|---|---|---|---|
| 3,382,354 A | 5/1968 | Hedgewitch | |
| 3,759,084 A | 9/1973 | Plewka | |
| D243,880 S | 3/1977 | Anderson | |
| D244,797 S | 6/1977 | Leahy | |
| 4,320,906 A * | 3/1982 | Saunders, IV | 362/474 |
| D265,252 S | 6/1982 | McNaughton | |
| D266,027 S | 8/1982 | Saunders | |
| D281,359 S * | 11/1985 | Ofield | D26/139 |
| 4,963,798 A | 10/1990 | McDermott | |
| 5,515,245 A | 5/1996 | Bobcza | |
| D375,568 S | 11/1996 | Matthies | |
| D388,530 S | 12/1997 | Hellhake | |
| 5,791,757 A | 8/1998 | O'Neil | |
| 5,984,494 A | 11/1999 | Chapman | |
| D437,970 S | 2/2001 | Nelson | |
| 6,220,736 B1 | 4/2001 | Dobler | |
| D461,273 S | 8/2002 | Ojstrsek | |
| 6,464,379 B1 * | 10/2002 | Mc Kenna | 362/473 |
| D465,860 S | 11/2002 | Huang | |
| D469,213 S | 1/2003 | Huang | |
| 6,504,477 B1 | 1/2003 | Lin | |
| D471,657 S | 3/2003 | Huang | |
| D484,637 S | 12/2003 | Yang | |
| D494,706 S | 8/2004 | Tsai | |
| 6,820,756 B2 * | 11/2004 | Garza | 211/87.01 |
| 6,840,661 B2 * | 1/2005 | Desjardins | 362/545 |
| 7,002,458 B2 * | 2/2006 | Su | 340/465 |
| 7,055,999 B2 * | 6/2006 | Lin | 362/548 |
| 2002/0024822 A1 | 2/2002 | Pond | |

* cited by examiner

*Primary Examiner*—Bradley Thompson

(57) ABSTRACT

An integrated motorcycle light frame and turn indicator is provided. In one embodiment, the integrated light frame and turn siganal includes both turn-signals integrated into a headlight frame, or bezel. One feature of the present invention is that the manufacturer installed turn signal lights may be eliminated. Alternatively, the additional lights provided by the integrated light frame and turn signal assembly provided additional warning to on-coming motorists that a motorcycle rider wishes to turn. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

18 Claims, 3 Drawing Sheets

INTEGRATED MOTORCYCLE LIGHT FRAME AND TURN SIGNAL ASSEMBLY

FIELD OF THE INVENTION

The present invention generally relates to vehicle lighting. More particularly, the invention concerns an integrated motorcycle light frame and turn signal assembly.

BACKGROUND OF THE INVENTION

The popularity of motorcycling continues to increase. Riders are attracted to the freedom of the open road, leaving behind the cares and worries of everyday life. Motorcycle manufacturers have seized upon the recent surge in popularity and have been selling motorcycles and accessories in record numbers.

While luring riders with their freedom and performance, motorcycles are substantially more dangerous than automobiles. A motorcycle rider almost always fares much worse than an automobile driver when an accident between the two vehicles occurs. With the increase in motorcycle popularity, has come an increase in motorcycle accidents. In response, some states have mandated that motorcycle riders must wear helmets, and also suggest that they wear reflective vests and protective clothing.

Motorcycle manufacturers have also introduced several safety features aimed at increasing safety. For example, motorcycle headlights are always illuminated, day or night. Brake performance has improved, decreasing braking distances, and tire reliability has reduced blow-out incidents. Still, statistics show that motorcycles continue to be many times more dangerous than automobiles.

Therefore, there exists a need for an apparatus that improves motorcycle safety, while also improving motorcycle aesthetics.

BRIEF DESCRIPTION OF THE DRAWINGS

Various embodiments of the present invention taught herein are illustrated by way of example, and not by way of limitation, in the figures of the accompanying drawings, in which.

Figure 1:
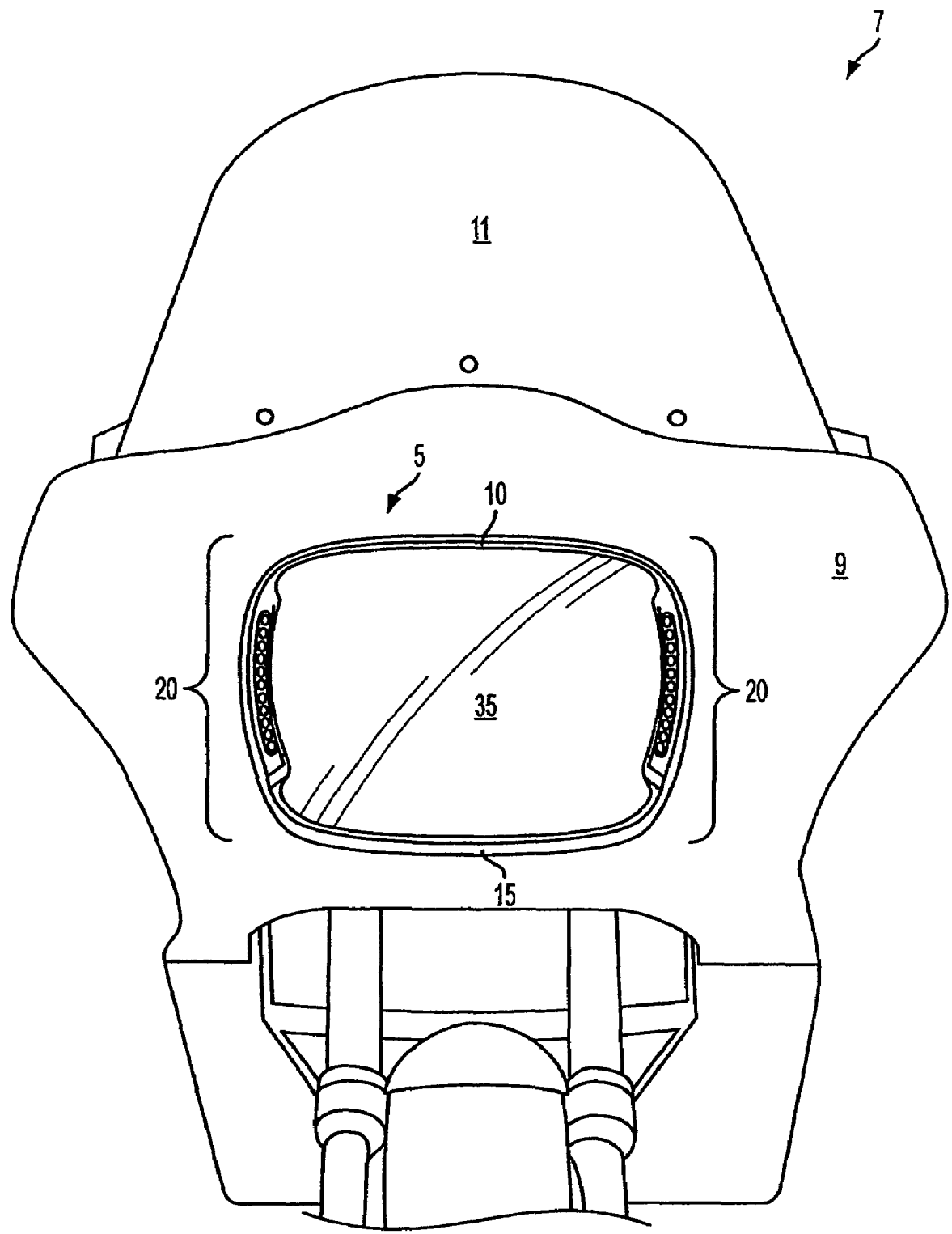
FIG. 1 is a front view of a motorcycle with one embodiment of the present invention mounted thereon.

It will be recognized that some or all of the figures are schematic representations for purposes of illustration and do not necessarily depict the actual relative sizes or locations of the elements shown. The figures are provided for the purpose of illustrating one or more embodiments of the invention with the explicit understanding that they will not be used to limit the scope or the meaning of the claims.

Features and advantages of the present invention will be appreciated from review of the following detailed description of the invention, along with the accompanying figures in which like reference numerals are used to describe the same, similar or corresponding parts in the several views of the drawings.

DETAILED DESCRIPTION OF EMBODIMENTS OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention provides an integrated light frame and turn signal assembly that includes both turn-signals integrated into the headlight frame, or bezel. One feature of the present invention is that the manufacturer installed turn signal lights may be eliminated. Alternatively, for those motorcycle owners who wish to increase safety by increasing their "conspicuity" (i.e., their visibility), the additional lights provided by the integrated light frame and turn signal assembly 5 provide additional warning to on-coming motorists that the motorcycle rider wishes to turn.

Motorcycles have been in production for over 100 years, built by manufacturers such as Aprils, BMW, Buell, Ducati, Harley-Davidson, Honda, Indian, Kawasaki, Moto Uzi, Suzuki, Triumph, Victory, Yamaha, and others. It will be appreciated that the present invention may be installed on any motorcycle built by the above-listed manufacturers, or other un-named manufacturers (some, or all of the above-listed manufacturer names may be registered trademarks of their respective owners).

One manufacturer that has become very popular in the United States, as well as through-out the world, is Harley-Davidson. Harley-Davidson manufactures many different models of motorcycles, which may be generally categorized into five different types: Touring models, Softail models, Spotter models, Dyna Glide models, and V-Rod models (Harley-Davidson is a registered trademark of H-D Michigan, Inc., of Ann Arbor Mich.).

For example, touring models may include the FLHT Electra Glide standard, FLHTC Electra Glide classic, FLHTCU Ultra Classic Electra Glide, FLHTP Electra Glide police, FLHS Electra Glide sport, FLHR Road King, FLHRC Road King classic, FLHP Road King police, FLTC Tour Glide classic, FLTCU Ultra classic tour Glide, FLTR Road Glide, FLHRS Road King custom, FLHRI Road King, FLHRSI Road King custom, FLHRCI Road King classic, FLTRI Road Glide, FLHTI Electra Glide standard, FLHTCI Electra Glide classic, and the FLHTCUI Ultra Classic Electra Glide (some or all of the above model names may be registered trademarks of H-D Michigan, Inc., of Ann Arbor Mich.).

Sportster models may include the Sportster XL883, Sportster XL883L, Sportster XL883C, Sportster XL883C custom, Sportster XL883R, Sportster XLH883, Sportster XLH883 Hugger, Sportster XLH883 Deluxe, Sportster XL1200C, Sportster XL1200C custom, Sportster XL1200R, Sportster XL1200R Roadster, Sportster XLH1200, and the Sportster 1200S Sport (some or all of the above model names may be registered trademarks of H-D Michigan, Inc., of Ann Arbor Mich.).

Dyna Glide models may include the FXD Dyna Super Glide, FXDX Dyna Super Glide sport, FXDXT Dyna Super Glide T-sport, FXDL Dyna Low Rider, FXDP Dyna Defender, FXDS-CONV Dyna Convertible, FXDWG Dyna Wide Glide, FXDC/I Super Glide Custom, FXDI Dyna Super Glide, FXDXI Dyna Super Glide sport, FXDCI Super Glide custom, FXDLI Dyna Low Rider, and the FXDWGI Dyna Wide Glide (some or all of the above model names may be registered trademarks of H-D Michigan, Inc., of Ann Arbor Mich.).

V-Rod models may include the VRSCA V-Rod, VRSCB V-Rod, and the VRSCR Street Rod (some or all of the above model names may be registered trademarks of H-D Michigan, Inc., of Ann Arbor Mich.).

Softail models may include the FXST Softail Standard, FXSTI Softail Standard, FXSTB Night Train, FXSTBI Night Train, FXSTSI Springer Softail, FXSTDI Deuce, FLSTF Fat Boy, FLSTFI Fat Boy, FLSTFI Fat Boy 15th Anniversary Special Edition, FLSTNI Softail Deluxe, FLSTSCI Softail Springer Classic, FLSTC Heritage Softail Classic, FLSTCI Heritage Softail Classic, FLSTN Heritage Softail Special, FLSTS Heritage Springer, FXSTC Softail Custom, FXSTD Softail Deuce, FXSTS Springer Softail, and the FXSTSB Bad Boy (some or all of the above model names may be registered trademarks of H-D Michigan, Inc., of Ann Arbor Mich.).

Clearly, Harley-Davidson manufactures many different motorcycle models. It will be appreciated that the present invention may be installed on any of the above-listed models, or on other models yet to be manufactured. In addition, the present invention may be installed on a "custom" motorcycle, which is a motorcycle that differs from a manufacturer-produced model. For example, a custom motorcycle may be a Harley-Davidson FXST Softail Standard that has had specific parts either added, removed or modified. Or, a custom motorcycle may be built from scratch, using no, or very few pre-manufactured parts, such as only the engine, transmission and tires.

Whether a motorcycle is custom, or manufactured by Harley-Davidson or another manufacturer, it generally includes a headlight and turn-signal lights, or turn indicators that warn other motorists of the motorcycle riders' intention to turn. The headlight, which may comprise a single light or two or more lights, may be mounted alone, or may be installed within a "fairing," which is an enclosure on the front of the motorcycle that provides wind protection to the rider. Some fairings may have windshields, or windscreens while others may not include a windshield. Some fairings may be attached to the motorcycle frame, or other components, and thus not move relative to the frame, or the fairing may be attached to the forks and move as the handlebars are turned.

For example, as shown in FIG. 1, a motorcycle 7 includes a fairing 9 that has a windshield 11. The illustrated fairing 9 may be mounted to the frame (not shown) or other motorcycle components, and does generally not move relative to the motorcycle frame. It will be appreciated that the fairing 9 may have a shape that differs from what is illustrated, and may not include a windshield 11.

Figure 2:
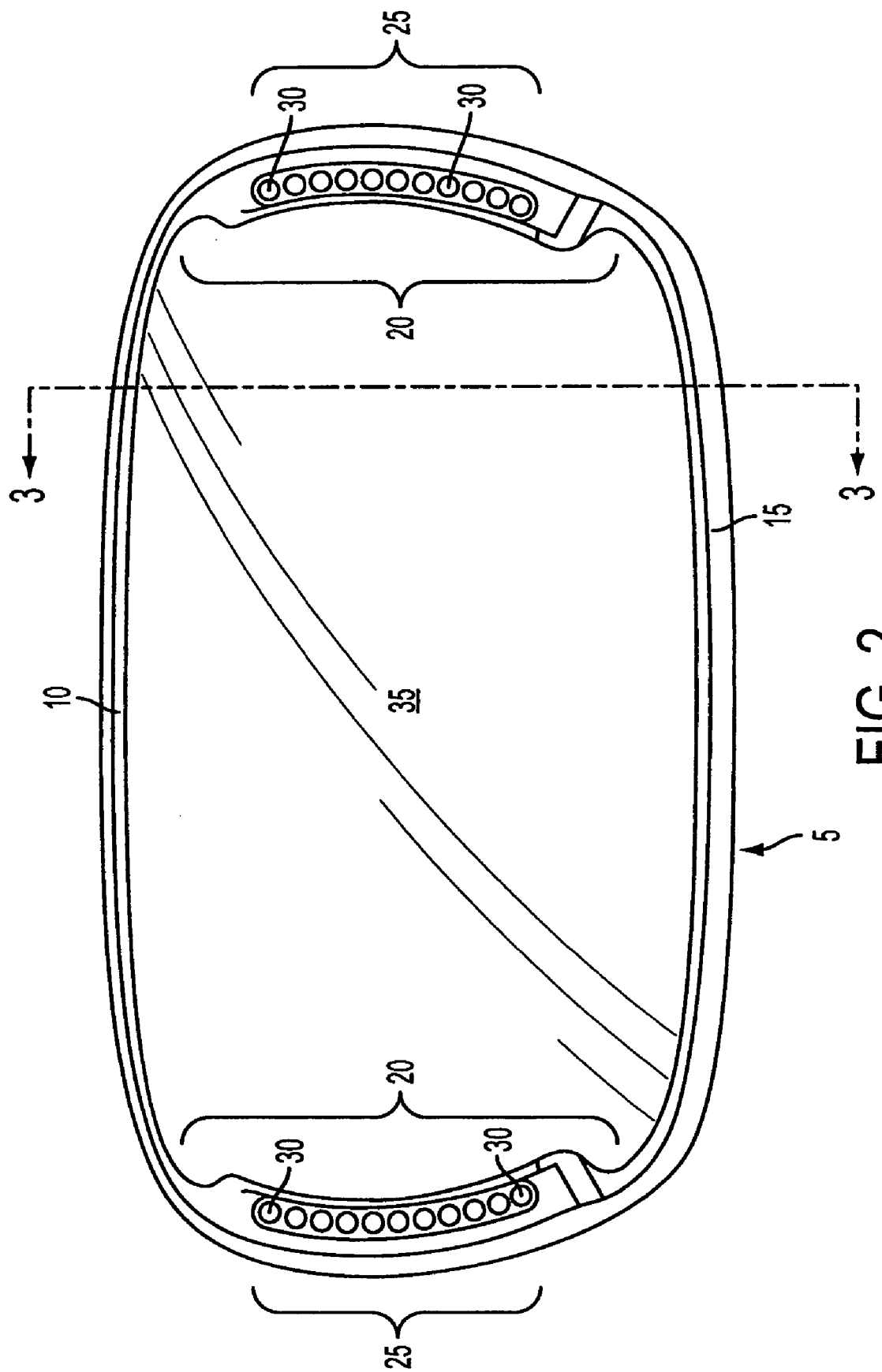
FIG. 2 is a front view of the embodiment of the present invention shown in FIG. 1.
Figure 3:
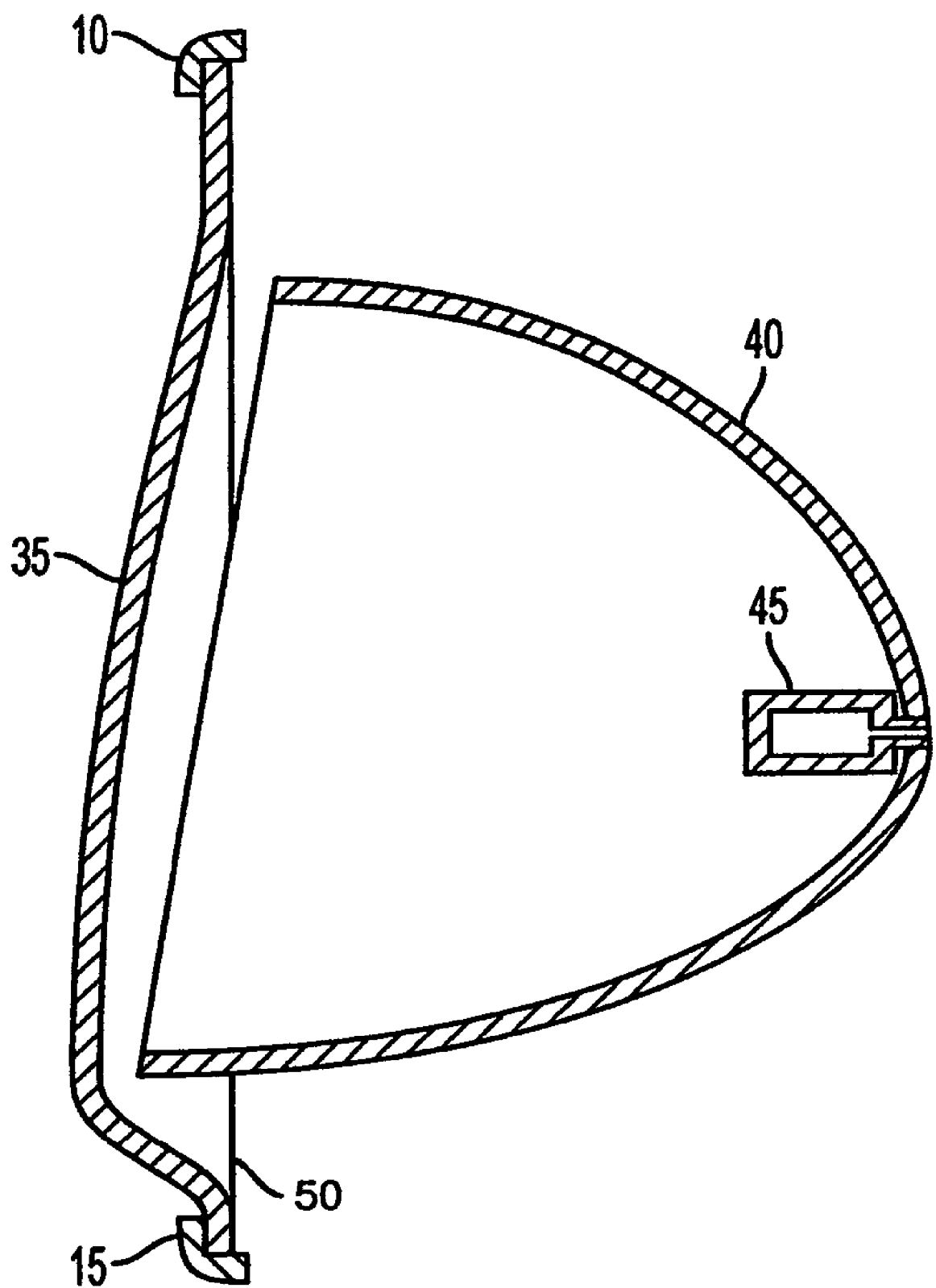
FIG. 3 is a sectional view taken through cutting plane 3-3 of FIG. 2.

Referring now to FIGS. 1-3, the fairing 9 (shown in FIG. 1) includes an integrated light frame and turn signal assembly 5. The integrated light frame and turn signal assembly 5 is mounted in front of, or over the motorcycle headlight 40 (shown in FIG. 3). The integrated light frame and turn signal assembly 5 also comprises a top section 10, a bottom section 15 and two side sections 20 that combine to form a bezel or headlight frame that surrounds the headlight 40. The integrated light frame and turn signal assembly 5 also includes a lens 35 that may be clear (i.e., substantially transparent), or it may be opaque, tinted or "smoked" to partially obscure the headlight 40 from view. It will be appreciated by those skilled in the art that the tint may be virtually any color, such as gray, yellow, brown, blue or any other desired color. It will also be appreciated that the color or surface finish of the integrated light frame and turn signal assembly 5 may be as desired. For example, the integrated light frame and turn signal assembly 5 may be chrome, anodized in any color or finish, or painted a color to match the motorcycle, or painted any desired color.

Referring now to FIG. 2, one feature of the integrated light frame and turn signal assembly 5 is that it includes two side sections 20 that have one or more lights 30 located in an illumination section 25. In one embodiment, each illumination section 25 comprises a plurality of light emitting diodes (LEDs) that may be any desired color, such as red, yellow, blue, green or any other desired color. Other embodiments of the illumination section 25 may comprise one or more incandescent lights, halogen lights, fluorescent lights, or any other type of device that emits electromagnetic radiation that is perceived by the human eye.

As shown in FIG. 2, the illumination sections 25 are positioned within the side sections 20 of the integrated light frame and turn signal assembly 5. One feature of the present invention is that the illumination sections 25 function as turn-signal indicators (i.e., turn lights). For example, a motorcycle rider, wishing to turn, activates a turn signal switch or other mechanism on the motorcycle 7. The turn signal switch activates the lights 30 located in the appropriate illumination section 25. With reference to FIG. 1, a rider wishing to turn left would activate the lights 30 in the illumination section 25 on the left side of the integrated light frame and turn signal assembly 5, and when wishing to turn right, the lights 30 in the illumination section 25 on the right side of the integrated light frame and turn signal assembly 5 would be activated. Activation of either illumination section 25 may illuminate the lights 30 in a flashing, strobe or other type of illumination pattern.

One advantage of the integrated light frame and turn signal assembly 5 is that both turn-signals are now integrated into the headlight 40 frame, or bezel thereby eliminating the turn signal lights that are usually mounted on stalks that extend from the fairing, or from other parts of the motorcycle. For motorcycle owners that wish to "customize" their motorcycles by "cleaning up" the motorcycle (i.e., eliminating components), the integrated light frame and turn signal assembly 5 eliminates the turn signals installed by the manufacturer.

Alternatively, for those motorcycle owners who wish to increase safety by increasing their "conspicuity" (i.e., their visibility), the additional lights provided by the integrated light frame and turn signal assembly 5 provide additional warning to on-coming motorists that the rider wishes to turn. In this case, the owner may wish to retain the original, manufacturer installed turn signals, and add the additional turn signals provided in the integrated light frame and turn signal assembly 5.

Referring now to FIG. 3, another embodiment of the present invention is illustrated. Some fairings 9 may be designed to closely fit around the headlight, or headlights 40 that each include a headlight bulb 45. This type of fairing 9, or other fairing designs, may be constructed to allow a portion of the headlight 40 to project out, or extend from the fairing 9. To accommodate this type of fairing 9, another embodiment integrated light frame and turn signal assembly 5 may include a lens 35 that is not substantially planar, but instead includes a bulge, or otherwise extends out from the top section 10, bottom section 15 and side sections 20 of the integrated light frame and turn signal assembly 5.

As shown in FIG. 3, a vertical plane 50 defined by the inner surface of the lens 35 where it mounts to the top section 10 and bottom section 15 is illustrated. A portion of the lens 35 extends outward from the vertical plane 50, and beyond the top section 10 and bottom section 15 of the integrated light frame and turn signal assembly 5. It will be appreciated that the size and 5 shape of the outward-protruding section of the lens 35 may vary with different fairing 9 shapes. This protruding feature of the lens 35 allows the integrated light frame and turn signal assembly 5 to be fitted on fairings 9 that have headlights 40 that extend from the surface of the fairing 9.

In one embodiment the lens 35 may be manufactured from glass, but other embodiments may be manufactured of plastic or other suitable materials, such as, polymers, polyesters and other substantially transparent materials. Another embodiment of the integrated light frame and turn signal assembly 5 may include an "O-ring" or gasket (not shown) that may be positioned between the integrated light frame and turn signal assembly 5 and the fairing 9. The gasket may prevent moisture from entering the space between the headlight 40 and the lens 35.

The integrated light frame and turn signal assembly 5 may be fitted on two-wheel motorcycles (with or without a sidecar), "trikes" (three-wheeled motorcycles), and micro-automobiles that have a single headlight, or a single headlight cluster.

Thus, it is seen that an integrated light frame and turn signal assembly is provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A motorcycle apparatus, comprising:
    a motorcycle headlight frame, structured to be positioned substantially about a perimeter of a motorcycle headlight; and
    at least two light elements located on the motorcycle headlight frame, with each of the light elements structured to provide a turn signal indication.

2. The motorcycle apparatus of claim 1, where the turn signal indication comprises either a left-turn warning or a right-turn warning.

3. The motorcycle apparatus of claim 1, where the motorcycle headlight frame comprises a motorcycle headlight bezel.

4. The motorcycle apparatus of claim 1, where each of the at least two light elements comprises at least one light emitter selected from a group consisting of: an incandescent light, a light-emitting diode (LED), a fluorescent light, and a halogen light.

5. The motorcycle apparatus of claim 1, where the motorcycle headlight frame is structured to removeably couple to a motorcycle fairing.

6. The motorcycle apparatus of claim 1, further comprising a lens coupled to the frame, with a portion of the lens extending beyond a surface of the frame.

7. The motorcycle apparatus of claim 1, further comprising a lens removeably coupled to the frame, with a portion of the lens extending beyond a plane defined by a top and a bottom section of the frame.

8. An integrated motorcycle headlight frame and turn signal indicator, comprising:
    a motorcycle headlight frame, structured to be positioned substantially about a perimeter of a motorcycle headlight;
    at least two light elements located on the motorcycle headlight frame, with each of the light elements structured to provide a turn signal indication; and
    a lens removeably coupled to the motorcycle headlight frame.

9. The integrated motorcycle headlight frame and turn signal indicator of claim 8, where a portion of the lens extends beyond a surface of the frame.

10. The integrated motorcycle headlight frame and turn signal indicator of claim 8, where a portion of the lens extends beyond a plane defined by a top and a bottom section of the frame.

11. The integrated motorcycle headlight frame and turn signal indicator of claim 8, where the turn signal indication comprises either a left-turn warning or a right-turn warning.

12. The integrated motorcycle headlight frame and turn signal indicator of claim 8, where the motorcycle headlight frame comprises a motorcycle headlight bezel.

13. The integrated motorcycle headlight frame and turn signal indicator of claim 8, where each of the at least two light elements comprises at least one light emitter selected from a group consisting of: an incandescent light, a light-emitting diode (LED), a fluorescent light, and a halogen light.

14. The integrated motorcycle headlight frame and turn signal indicator of claim 8, where the motorcycle headlight frame is structured to removeably couple to a motorcycle fairing.

15. An integrated motorcycle headlight frame and turn signal indicator, comprising:
    a motorcycle headlight frame, structured to be positioned substantially about a perimeter of a motorcycle headlight;
    at least two light elements located on the motorcycle headlight frame, with each of the light elements structured to provide a turn signal indication; and
    a lens coupled to the motorcycle headlight frame, with a portion of the lens extending beyond a plane defined by a top and a bottom section of the motorcycle headlight frame.

16. The integrated motorcycle headlight frame and turn signal indicator of claim 15, where the lens is removeably coupled to the motorcycle headlight frame.

17. The integrated motorcycle headlight frame and turn signal indicator of claim 15, where the turn signal indication comprises either a left-turn warning or a right-turn warning.

18. The integrated motorcycle headlight frame and turn signal indicator of claim 15, where each of the at least two light elements comprises at least one light emitter selected from a group consisting of: an incandescent light, a light-emitting diode (LED), a fluorescent light, and a halogen light.

* * * * *